Dec. 23, 1952
P. ROBINSON
2,623,096
ELECTRICAL CAPACITOR
Filed Sept. 27, 1949
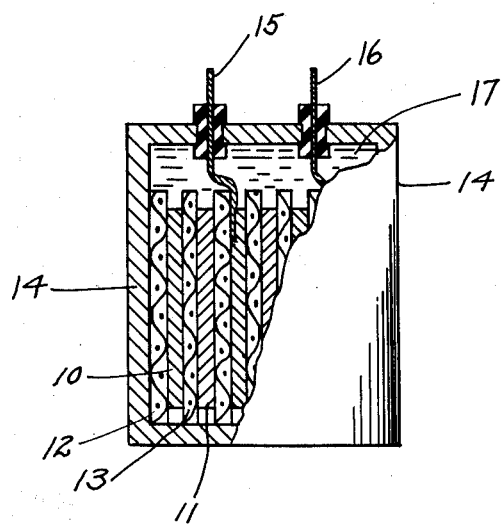
PRESTON ROBINSON
INVENTOR.
BY Patented Dec. 23, 1952

2,623,096

UNITED STATES PATENT OFFICE 2,623,096

ELECTRICAL CAPACITOR

Preston Robinson, Williamstown, Mass., assignor to Sprague Electric Company, North Adams, Mass., a corporation of Massachusetts Application September 27, 1949, Serial No. 118,003

5 Claims. (Cl. 175—41)

This invention relates to electrical capacitors and more specifically refers to improved electrical capacitors employing liquid impregnants.

The recent progress in fluorine chemistry has led to the development of a broad series of partially and fully fluorinated hydrocarbons. These materials range from gases and liquids to normally solid waxes and resins. The dielectric properties are usually satisfactory and the compounds are quite inert from chemical and physical standpoints. They have been proposed as fillants and impregnants for transformers, capacitors, etc., in addition to their more immediate application as heat transfer agents and the like.

The disadvantages of these materials, in addition to their high cost, may be attributed to their characteristic inertness. The fluorocarbons, though the surface tension is moderately low, do not wet surfaces in the manner of polar materials. As a result, the film forming and maintaining properties are poor. In electrical capacitors, bubbles of air, voids and the like are not readily replaced or filled by the fluorocarbons. Undesirable voltage gradients and electrical breakdown may therefore ocur. Another disadvantage resides in the poor viscosity and expansion characteristics possessed by the perfluoro aliphatic hydrocarbons, coupled with fairly limited liquid phase ranges. Thus capacitors employing such liquid impregnants cannot ordinarily be employed over a temperature range of −30° C. to +150° C. without solidification and/or boiling of the impregnant. Arrangements must be made for the appreciable expansion of the liquid over its useful operating range.

It is an object of the present invention to overcome the foregoing and related disadvantages. A further object is to produce new and improved electrical capacitor structures. A still further object is to produce relatively inexpensive electrical capacitors possessing outstanding electrical and physical characteristics. Additional objects will become apparent from the following description and claims.

These objects are attained in accordance with the present invention wherein there is produced an electrical capacitor comprising metal electrodes insulated with a dielectric fluid consisting of a perfluoro organic compound selected from the class containing nitrogen, oxygen and sulfur. In its preferred embodiments the invention is concerned with an electrical capacitor comprising metal electrodes separated by dielectric spacing material impregnated with a dielectric fluid selected from the class comprising perfluoro aliphatic amines having a surface tension less than about 18 dynes per cm. at room temperature.

According to one of the limited embodiments of the invention, I produce an electrical capacitor comprising metal electrode foils separated by a hydrocarbon resin film and impregnated with a perfluoro tertiary aliphatic amine containing between 6 and 36 carbon atoms. A preferred example of this embodiment embodies an electrical capacitor comprising metal electrode foils separated by a polystyrene resin film and impregnated with perfluorotributyl amine.

My invention is concerned with improved electrical capacitors employing polar perfluoro organic compounds. The materials disclosed herein possess completely unexpected advantages when employed as dielectric fillants and impregnants without being subject to the disadvantages associated with perfluorohydrocarbons or polar nuclei dielectrics. The novel combination of the materials with certain solid dielectric materials permits manufacture of electrical capacitors with outstanding characteristics.

The dielectric impregnants are selected from the class containing perfluoro organic compounds containing nitrogen, sulfur and/or oxygen. These polar elements may be part of an aliphatic, aromatic or heterocyclic structure, but preferably appear in aliphatic structures. For example, preferred classes include the perfluoro aliphatic amines, sulfides and ethers. Tertiary amines are preferred over secondary and primary amines, and I generally prefer that the fluorine atoms be substituted only on the carbon atoms, replacing the hydrogen atoms normally associated therewith.

Representative perfluoro aliphatic ethers are the perfluoro derivatives of the following:

| | |
|---|---|
| Allyl ethyl ether | Ethyl hexyl ether |
| Allyl isoamyl ether | Ethyl isoamyl ether |
| Amyl ethyl ether | Butyl ether |
| n-Butyl ethyl ether | Amyl ether |
| Cetyl methyl ether | Cetyl ether |
| Cetyl ethyl ether | Isoamyl ether |
| Ethyl heptyl ether | Octyl ether |

Representative of the perfluoro tert-alkyl amines are the perfluoro derivatives of the following:

Tributyl amine
Tripropyl amine
Triamyl amine
Triisoamyl amine
Triisobutyl amine
Trihexyl amine
Triheptyl amine
Trioctyl amine
Diethylpropyl amine
Ethyl dipropyl amine
Diethyl amyl amine
Dibutylpropyl amine
Diethyl butyl amine
Dipropylamyl amine, etc.

Representative sulfur containing compounds include perfluoro derivatives of the following:

Propyl sulfide
Butyl sulfide
Amyl sulfide
Hexyl sulfide
Octyl sulfide
Isobutyl sulfide
Isoamyl sulfide
Butyl amyl sulfide
Methyl cetyl sulfide, etc.

Reference may be made to the appended drawing which shows a capacitor consisting of electrode foils 10 and 11 separated by dielectric spacing materials 12 and 13. The capacitor is assembled in container 14, terminal elements 15 and 16 protruding from the top of container 14. Dielectric fluid 17 fills the freeboard within container 14 and impregnates the voids within spacers 12 and 13.

The solid dielectric spacers of the invention preferably comprise low-loss solids which can be wound or otherwise introduced into capacitor structures. Particularly desirable for this purpose are polyethylene, polytetrafluoroethylene and polystyrene resin films. The invention is of special value for polystyrene dielectrics since this resin is normally soluble or swellable in the better hydrocarbon dielectric liquids. The dielectric fillants and impregnants of my invention permit the fabrication of liquid filled polystyrene capacitors of very low electrical loss, comparable to that obtained with gaseous fillants, such as sulfur hexafluoride. However, my liquid filled capacitors may operate at extremely high power levels, since the small amount of heat generated is rapidly removed by conduction and convection through the liquid.

For optimum breakdown voltage values, I have found that the low surface tension of my liquid dielectrics is of importance, e. g. values preferably less than about 18 dynes per cm. at room temperature. Minute bubbles and voids are eliminated when my liquids are employed as fillants. Such bubbles and voids frequently led to low breakdown voltages in prior art capacitors.

It is to be understood that other dielectric spacers may be employed with satisfactory results, although higher electrical losses may result from the use of these solid dielectrics. For example, glass cloth, paper, mica and the like may be employed.

Particularly outstanding electrical capacitors have been made with spacers of polytetrafluoroethylene and polystyrene resin film impregnated with perfluoro tributyl amine, perfluorotriamyl amine and perfluoro dibutyl propyl amine. The ultimate capacitors have had power factors less than 0.02% at 1000 cycles and room temperature.

As many different embodiments of this invention may be made without departing from the spirit and scope hereof, it is to be understood that the invention is not limited to the specific embodiments hereof except as defined in the appended claims.

I claim:

1. An electrical capacitor comprising metal electrodes spaced from each other, and between the electrodes a dielectric fluid perfluoro organic compound including an element selected from the class consisting of nitrogen, oxygen and sulfur.

2. An electrical capacitor comprising metal electrodes separated by dielectric spacing material impregnated with a dielectric perfluoro aliphatic amine having a surface tension less than about 18 dynes per cm. at room temperature.

3. An electrical capacitor comprising metal electrode foils separated by a hydrocarbon resin film, said capacitor being impregnated with a perfluoro tertiary aliphatic amine containing between 6 and 36 carbon atoms.

4. An electrical capacitor comprising metal electrode foils separated by a polystyrene resin film, said capacitor being impregnated with perfluorotributyl amine.

5. An electrical capacitor comprising metal electrode foils separated by a polytetrafluoroethylene resin film, said capacitor being impregnated with perfluorotriamyl amine.

PRESTON ROBINSON.

REFERENCES CITED

The following references are of record in the file of this patent:

UNITED STATES PATENTS

| Number | Name | Date |
|---|---|---|
| 1,953,216 | Elsey | Apr. 3, 1934 |
| 2,307,488 | Clark | Jan. 5, 1943 |
| 2,392,389 | Joyce | Jan. 8, 1946 |
| 2,433,844 | Hanford | Jan. 6, 1948 |
| 2,512,874 | Reynolds | June 27, 1950 |

FOREIGN PATENTS

| Number | Country | Date |
|---|---|---|
| 511,580 | England | Aug. 21, 1939 |

OTHER REFERENCES

"Industrial and Engineering Chemistry," vol. 39, March 1947, page 239.